United States Patent
Llagostera et al.

(10) Patent No.: US 10,423,647 B2
(45) Date of Patent: Sep. 24, 2019

(54) DESCRIPTIVE DATACENTER STATE COMPARISON

(71) Applicant: CA, INC., New York, NY (US)

(72) Inventors: Jaume Ferrarons Llagostera, Barcelona (ES); David Solans Noguero, Barcelona (ES); David Sanchez Charles, Barcelona (ES); Alberto Huelamo Segura, Barcelona (ES); Marc Sole Simo, Barcelona (ES); Victor Muntes Mulero, Barcelona (ES)

(73) Assignee: CA, Inc., New York, NY (US)

( * ) Notice: Subject to any disclaimer, the term of this patent is extended or adjusted under 35 U.S.C. 154(b) by 205 days.

(21) Appl. No.: 15/392,591

(22) Filed: Dec. 28, 2016

(65) Prior Publication Data
US 2018/0173789 A1 Jun. 21, 2018

(30) Foreign Application Priority Data
Dec. 21, 2016 (ES) .................................. 201631639

(51) Int. Cl.
*G06F 16/00* (2019.01)
*G06F 16/28* (2019.01)
(Continued)

(52) U.S. Cl.
CPC ...... *G06F 16/288* (2019.01); *G06F 16/24578* (2019.01); *G06F 16/353* (2019.01); *G06F 16/9024* (2019.01); *G06N 7/005* (2013.01)

(58) Field of Classification Search
CPC ......... G06F 17/30675; G06F 17/30628; G06F 17/30958; G06F 17/30604;
(Continued)

(56) References Cited

U.S. PATENT DOCUMENTS 9,231,833 B1 1/2016 Bandopadhyay
9,383,970 B2 7/2016 Joy et al.
(Continued)

OTHER PUBLICATIONS

Rogers, David, and Mathew Hahn. "Extended-connectivity fingerprints." Journal of chemical information and modeling 50.5 (2010): 742-754.

(Continued)

*Primary Examiner* — Anh Ly
(74) *Attorney, Agent, or Firm* — Shook, Hardy & Bacon L.L.P.

(57) ABSTRACT

In a datacenter setting, a summary of differences and similarities between two or more states of the same or similar systems are predicted. Initially, a Long Short-Term Memory (LSTM) neural network is trained with to predict a summary describing the state change between at least two states of the datacenter. Given a set of training data (at least two datacenter states that are annotated with a state change description), the LSTM neural network learns which similarities and differences between the datacenter states correspond to the annotations. Accordingly, given a set of test data comprising at least two states of a datacenter represented by context graphs that indicate a plurality of relationships among a plurality of nodes corresponding to components of a datacenter, the LSTM neural network is able to determine a state change description that summarizes the differences and similarities between the at least two states of the datacenter.

20 Claims, 6 Drawing Sheets

(51) Int. Cl.
*G06N 7/00* (2006.01)
*G06F 16/901* (2019.01)
*G06F 16/2457* (2019.01)
*G06F 16/35* (2019.01)

(58) Field of Classification Search
CPC ........... G06F 17/30707; G06F 17/3053; G06F 17/30; G06F 17/30371; G06F 17/30377; G06F 17/30864; G06F 17/30719; G06F 17/30867; G06F 16/288; G06F 16/353; G06F 16/24578; G06F 16/9024; G06F 16/00; G06F 16/334; G06F 16/33; G06F 16/901; G06N 7/005; G06N 99/005; G06N 5/022; G06N 5/047; G06N 3/08; G06N 3/04; H04L 43/08; H04L 67/10; H04L 67/02; H04L 41/147; H04L 43/0817; H04L 12/24; H04L 12/26; G06Q 20/0658; G06G 16/00
See application file for complete search history.

(56) References Cited

U.S. PATENT DOCUMENTS

| | | | | |
|---|---|---|---|---|
| 9,762,450 | B2 | 9/2017 | Xie et al. | |
| 9,817,805 | B1* | 11/2017 | Markman | G06F 17/241 707/E17.045 |
| 2005/0198244 | A1 | 9/2005 | Eilam et al. | |
| 2010/0121972 | A1* | 5/2010 | Samuels | H04L 41/082 709/231 |
| 2012/0137367 | A1 | 5/2012 | Dupont et al. | |
| 2012/0151026 | A1 | 6/2012 | Chen et al. | |
| 2013/0031454 | A1* | 1/2013 | Griffiths | G06F 17/2247 715/230 |
| 2014/0068032 | A1 | 3/2014 | Kannan et al. | |
| 2014/0164352 | A1 | 6/2014 | Denninghoff | |
| 2014/0282586 | A1* | 9/2014 | Shear | G06F 9/5072 718/104 |
| 2015/0188768 | A1* | 7/2015 | Maini | G06F 8/61 709/224 |
| 2016/0110434 | A1* | 4/2016 | Kakaraddi | G06F 17/30958 707/602 |
| 2016/0313780 | A1* | 10/2016 | Stewart | G06F 9/5083 |
| 2016/0359872 | A1* | 12/2016 | Yadav | H04L 43/04 707/E17.014 |
| 2017/0322241 | A1* | 11/2017 | Tang | G06N 99/005 707/E17.101 |
| 2018/0284743 | A1* | 10/2018 | Cella | G05B 23/024 707/E17.032 |
| 2018/0284745 | A1* | 10/2018 | Cella | G05B 23/024 707/E17.085 |

OTHER PUBLICATIONS

Duvenaud, David K., et al. "Convolutional networks on graphs for learning molecular fingerprints." Advances in Neural Information Processing Systems. 2015.

Xu, Kelvin, et al. "Show, attend and tell: Neural image caption generation with visual attention." arXiv preprint arXiv:1502.03044 2.3 (2015): 5.

Symmetric difference Wiki Page: https://www.wikiwand.com/en/Symmetric_difference.

Yll Haxhimusa. "Basics of Graph Theory". The Structurally Optimal Dual Graph Pyramid and its Application in Image Partitioning. Vienna University of Technology, Faculty of Informatics, Institute of Computer Aided Automation, Pattern Recognition and Image Processing Group. PhD Thesis, Chapter 2, 2006 (c) http://www.prip.tuwien.ac.at/twist/docs/graph_theory_basic_notions.pdf.

Learning to rank Wiki Page: https://www.wikiwand.com/en/Learning_to_rank.

Bodik, Peter, et al. "Fingerprinting the datacenter: automated classification of performance crises." Proceedings of the 5th European conference on Computer systems. ACM, 2010.

Debnath, Sandip, "Automatic Text-based Explanation of Events," A Thesis in Computer Science and Engineering, Dec. 2005, 200 pages. https://etda.libraries.psu.edu/files/final_submissions/6051.

Portet, Francois et al., "Automatic Generation of Textual Summaries from Neonatal Intensive Care Data," 46 pages. http://homepages.abdn.ac.uk/e.reiter/pages/papers/aij-bt45.pdf (2015).

Wang, Nan et al., "An Anomaly Detection Algorithm Based on Lossless Compression," 2012 IEEE Seventh International Conference on Networking, Architecture, and Storage, 8 pages. http://ieeexplore.ieee.org/abstract/document/6310873/.

Karpathy, Andrej et al., "Deep Visual-Semantic Alignments for Generating Image Descriptions," 17 pages. http://cs.stanford.edu/people/karpathy/cvpr2015.pdf.

Fei, Hongliang Fei et al., "Structure feature selection for graph classification," CIKM'08, Oct. 26-30, 2008, Napa Valley, California, USA, http://ittc.ku.edu/~jhuan/papers/cikm08_fei.pdf.

Frequent subgraph mining, 75 pages. https://www.csc.ncsu.edu/faculty/samatova/practical-graph-mining-with-R/slides/pdf/Frequent_Subgraph_Mining.pdf.

Huan, Jun et al., "Efficient Mining of Frequent Subgraph in the Presence of Isomorphism," 12 pages. https://www.ittc.ku.edu/~jhuan/papers/03-021.pdf.

Non-Final Office Action dated Sep. 10, 2018 in U.S. Appl. No. 15/392,585, 8 pages.

Non-Final Office Action dated Oct. 12, 2018 in U.S. Appl. No. 15/392,577, 20 pages.

* cited by examiner

| node    | A       | B                        | C              | D          | E          |
|---------|---------|--------------------------|----------------|------------|------------|
| 210— It. 0 | H(1)    | H(3)                     | H(2)           | H(1)       | H(1)       |
| 220— It. 1 | H(H(1)H(3)) | H(H(3)H(1)H(1)H(2)) | H(H(2)H(1)H(3)) | H(H(1)H(2)) | H(H(1)H(3)) |

|         | #N, it. 0 | #N, it. 1     | CPU, it. 0 | CPU, it. 1        |
|---------|-----------|---------------|------------|-------------------|
| Node A  | H(1)      | H(H(1)H(3))   | H(40%)     | H(H(40%)H(60%))   |
|         | 310       | 312           | 320        | 322               |

DESCRIPTIVE DATACENTER STATE COMPARISON

RELATED APPLICATION

This application claims priority to Spanish Application No. P 201631639, filed Dec. 21, 2016.

BACKGROUND

The growing complexity of large infrastructures, such as datacenters, frequently hinders the understanding of the system behavior. System administrators frequently analyze metrics extracted from components of the system, relationships between components of the system, as well as the overall system itself.

While data centers have a wide range of sizes from hundreds to thousands of components, it is common to store tens or even hundreds of different metrics at each timestamp from each component. Depending on the selected period for particular metrics to be read, which is typically a compromise between having the information updated enough and the required resources for the reading, processing, and storing the size of the data to be managed, the overall data increases exponentially over time. Building management tools that can effectively deal with these volumes of data becomes challenging as the systems grow in complexity. For example, not only is there a need of increased processing power for analyzing the amount of data in a feasible amount of time, but also a need for understanding a growing volume of data in a limited space and time as system administrators need to react as fast as possible to any anomaly in the system.

Thus, as the number of components in a datacenter increases, it becomes increasingly difficult to manually compare all the values or connections among components to uncover small changes in the metrics that, while not necessarily individually relevant, may be relevant in combination with other small changes.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

Embodiments of the present disclosure relate to comparing two or more states of the same or similar systems (computer network, datacenter, etc.) and summarizing the differences and similarities. More particularly, relevant facts regarding the differences and similarities can be automatically highlighted in a summary or report for a user. To do so, a classifier is trained with to predict a summary describing the state change comprising differences and similarities between at least two states of an input graph. Accordingly, given a set of input or test data comprising at least two states of a datacenter represented by context graphs that indicate a plurality of relationships among a plurality of nodes corresponding to components of a datacenter, a neural network (e.g., a long short-term memory (LSTM) neural network) is able to determine a state change comprising differences and similarities between the context graph for each state. Features corresponding to the differences and similarities between properties of particular nodes or relationships between particular nodes of each context graph are selected. Based on the selected features, a summary describing the state change between the at least two states of the datacenter is generated.

BRIEF DESCRIPTION OF THE DRAWINGS

The present invention is described in detail below with reference to the attached drawing figures, wherein.

DETAILED DESCRIPTION

Figure 1:
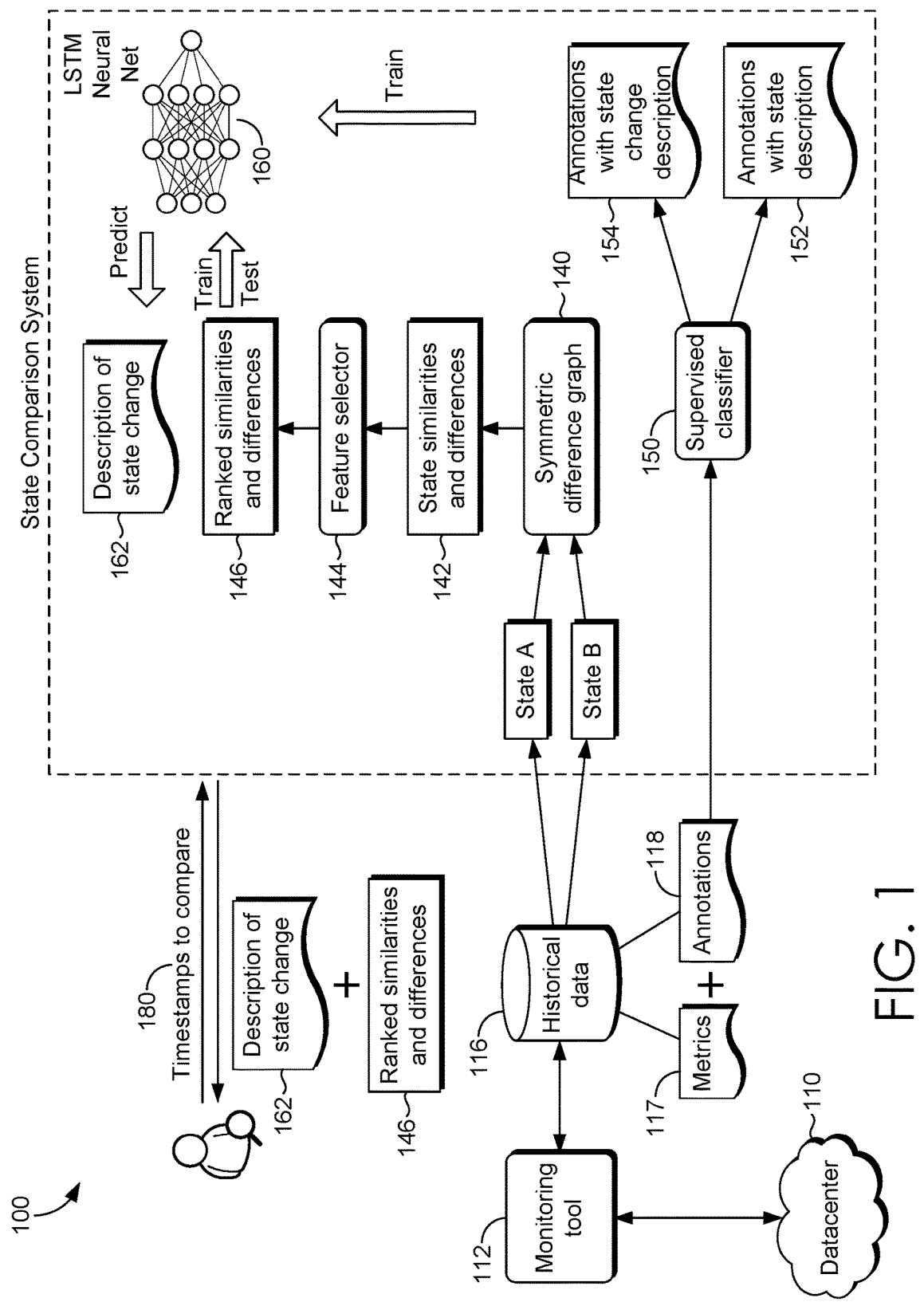
FIG. 1 is a block diagram showing a state comparison system that summarizes differences and similarities between states of a datacenter, in accordance with an embodiment of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. For example, although this disclosure refers to generating context graphs that represent datacenters in illustrative examples, aspects of this disclosure can be applied to generating context graphs that represent relationships between components in a local hardware or software system, such as a storage system or distributed software application. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

The term "component" as used in the description below encompasses both hardware and software resources. The term component may refer to a physical device such as a computer, server, router, etc., a virtualized device such as a virtual machine or virtualized network function, or software such as an application, a process of an application, database management system, etc. A component may include other components. For example, a server component may include a web service component which includes a web application component.

The term "context graph" or "graph embedding" refers to a data structure that depicts connections or relationships between components. A context graph consists of nodes (vertices, points) and edges (arcs, lines) that connect them. A node represents a component, and an edge represents a relationship between the corresponding components. Nodes and edges may be labeled or enriched with data or properties. For example, a node may include an identifier for a component, and an edge may be labeled to represent different types of relationships, such as a hierarchical relationship or a cause-and-effect type relationship. In embodiments where nodes and edges are enriched with data, nodes and edges may be indicated with data structures that allow for the additional information, such as JavaScript Object Notation ("JSON") objects, extensible markup language ("XML") files, etc. Context graphs may also be referred to in related literature as a triage map, relationship diagram/chart, causality graph, etc.

The term "subgraph" refers to a portion of a context graph. Subgraphs may be stored in a historical database as training data and may be aggregated to facilitate data imputation for missing data in a context graph. Subgraphs may additionally be utilized to diagnose particular problems in a datacenter. For example, if a particular problem occurs, the subgraphs that generate a particular hash for the particular problem may be provided to help identify a source of the problem in the datacenter.

Properties of a subgraph or context graph may be described by a "hash" or a "vector representation." A hash may be determined based on a particular property or properties of a node. The properties may be metrics of the node or aggregated neighbor related information. The aggregated neighbor related information may include a number of neighbors of the node, an absolute number of neighbors with some condition, a relative number of neighbors with some condition, a sum/maximum/minimum/average of some node properties, etc. For clarity, a "neighbor" corresponds to a node that is directly connected to the subject node by an edge. The edge may correspond to relationships among hardware and software components between the nodes.

The hash may be additionally computed through a predetermined number of iterations which may be based on a diameter of the subgraph or context graph, desired input size, etc. For example, at iteration 0, the hash includes a hash of the particular node. At iteration 1, the hash includes a hash of the hash of the particular node and the hash of neighbor nodes. At iteration 2, the hash includes a hash of the hash of the particular node, the hash of the neighbor nodes, and the hash of the neighbors of the neighbor nodes. In this way the hash provides a fingerprint or identifying characteristics of the subgraph or context graph corresponding to properties of nodes of the subgraph or context graph that can be utilized to identify similar subgraphs or context graphs.

A vector representation may correspond to the hash itself, or a string of hashes being considered (e.g., hashes of multiple properties or for multiple nodes). In embodiments, a vector representation corresponds to a subgraph or context graph as it evolves over time. For example, as a particular property or node changes over time, the vector representation represents the hash of the particular node as it changes over time which may help diagnose a particular root cause of an anomalous condition, predict a future state of the datacenter (e.g., a particular property or particular node), identify missing properties, summarize or annotate a state of the datacenter, compare states of the datacenter, and the like.

An "anomalous condition" or "anomaly" describes a message or notification of an unexpected occurrence or event in a system or in a component of the system at a point in time. An anomalous condition often relates to resource consumption and/or state of a system or system component. As examples, an anomalous condition may be that a file was added to a file system, that a number of users of an application exceeds a threshold number of users, that an amount of available memory falls below a memory amount threshold, or that a component stopped responding or failed. An anomalous condition can reference or include data or properties about the anomalous condition and is communicated to by an agent or probe to a component/agent/process that processes anomalous conditions. The data or properties about the anomalous condition may be utilized to build a context graph or a subgraph.

A "annotation" as used herein refers to a textual description that describes, at a high-level, a state description of a state of a datacenter or the difference between at least two states of the datacenter. The annotation may additionally provide a ranked list of the differences and similarities between the two states of the datacenter. Descriptions of states may include that the datacenter is operating normally while descriptions of state changes may include that a particular database cluster was switched off, the number of messages has increased and the message queue system has dynamically allocated more machines, and the like.

As noted in the background, the growing complexity of large infrastructures, such as datacenters, frequently hinders the understanding of the system behavior. System administrators frequently analyze metrics extracted from components of the system, relationships between components of the system, as well as the overall system itself.

While data centers have a wide range of sizes from hundreds to thousands of components, it is common to store tens or even hundreds of different metrics at each timestamp from each component. Depending on the selected period for particular metrics to be read, which is typically a compromise between having the information updated enough and the required resources for the reading, processing, and storing the size of the data to be managed, the overall data increases exponentially over time. Building management tools that can effectively deal with these volumes of data becomes challenging as the systems grow in complexity. For example, not only is there a need of increased processing power for analyzing the amount of data in a feasible amount of time, but also a need for understanding a growing volume of data in a limited space and time as system administrators need to react as fast as possible to any anomaly in the system.

Thus, as the number of components in a datacenter increases, it becomes increasingly difficult to manually compare all the values or connections among components to uncover small changes in the metrics that, while not necessarily individually relevant, may be relevant in combination with other small changes.

Embodiments of the present disclosure relate comparing two or more states of the same or similar systems (computer network, datacenter, etc.) and summarizing the differences and similarities. More particularly, relevant facts regarding the differences and similarities can be automatically highlighted in a summary or report for a user. To do so, a classifier is trained with to predict a summary describing the state change comprising differences and similarities between at least two states corresponding to an input graph. Accordingly, given a set of input or test data comprising at least two states of a datacenter represented by context graphs that indicate a plurality of relationships among a plurality of nodes corresponding to components of a datacenter, the LSTM neural network is able to determine an annotation corresponding to a state change comprising differences and similarities between the input graphs for each state. A symmetric difference graph corresponding to the differences and similarities between properties of particular nodes or relationships between particular nodes of each context graph is identified. Based on the symmetric difference graph, an annotation describing the state change between the at least two states of the datacenter is generated.

In practice, data is received from the different components of the datacenter at different states (e.g., timestamps). The data contains metrics corresponding to components of the datacenter and may be received from a historical database. Historical data may contain metrics of components of the datacenter as well as annotations corresponding to the datacenter.

Using the historical data, a LSTM neural network is trained with some iterative training method, for example, batch or stochastic gradient descent. To obtain a classifier that is reusable as much as possible across different datacenters (so that a classifier trained in a particular datacenter can be leveraged across multiple datacenters), the input neurons of the data, as explained in more detail below, contain a sequence of a configurable number of states. In this way, evolution of the datacenter can be a factor in both training and testing for the LSTM neural network. In some embodiments, a software as a service (SaaS) enables sharing of historical data or anonymized information pertaining to the structure of the LSTM neural network itself.

The data may be received in the form of a subgraph or context graph. The subgraph or context graph comprises nodes corresponding to components of the datacenter and edges corresponding to relationships between the nodes. A given node that is connected by an edge to another node is a neighbor of that node. Each node may include data or properties (e.g., metrics) that can be encoded using hashing techniques (e.g., a circular hashing process). The hash may additionally have a predetermined number of iterations which may be based on a diameter of the subgraph or context graph, desired input size, etc. A vector representation may correspond to the hash itself, or a string of hashes being considered (e.g., hashes of multiple properties or for multiple nodes).

In embodiments, each hash of a given node represents not just a set of events or metrics, but includes metrics of its neighbors. This enables relationships between nodes to be considered by the classifier, which may be essential in identifying more accurate summarizations of the differences and similarities between states of the datacenter. Alternatively, encodings, such as assuming a model in which at most k neighbors per node are considered (which may require a selection of the most important k neighbors if the node has more than k neighbors or dummy neutral input values when the node has less than k neighbors). Additional metrics that can be considered by the classifier and scale regardless of the how many neighbors a node has may include number of neighbors, percentage of neighbors with a particular condition, average of some continuous metrics of the neighbors (useful for instance to model demand on a database node if we consider the number of SQL queries as the continuous metric).

Thus, given two states of a datacenter, the LSTM neural network may identify similarities and differences between the two states of the datacenter. Using the similarities and differences, the LSTM neural network may additional identify features corresponding to the similarities and differences and rank the similarities and differences. The LSTM neural network may utilize the ranked similarities and differences to predict a description of the state change. In this way, subtle differences in states of a datacenter may be interpreted and described in a meaningful way for a user or administrator.

Accordingly, one embodiment of the present disclosure is directed to a method that facilitates generating an annotation describing a state change between at least two states of a datacenter. The method comprises receiving at least two states of a datacenter. Each state of the datacenter is represented by a context graph indicating a plurality of relationships among a plurality of nodes corresponding to components of the datacenter. The method also comprises, identifying a symmetric difference graph corresponding to the differences and similarities between properties of particular nodes or relationships between particular nodes of each context graph. The method further comprises selecting features from the symmetric difference graph corresponding to differences and similarities. The method also comprises ranking the selected features. The method further comprises, utilizing the ranked features, generating an annotation describing the state change between the at least two states of the datacenter.

In another embodiment of the present disclosure is directed to a method that facilitates training a classifier to predict an annotation describing the state change between at least two states of a datacenter. The method comprises receiving historical metrics from historical nodes for two historical states of a historical datacenter. The historical metrics are aggregated into a historical vector representation for the historical nodes for each state of the historical datacenter. The historical vector representation includes information derived from the historical metrics of neighbors of the historical nodes. The method further comprises training a classifier with the historical vector representation and a historical annotation describing a state change between the two historical states of the historical datacenter to predict an annotation describing the state change between at least two states of a datacenter.

In yet another embodiment, the present disclosure is directed to a computerized system that compares two or more states of the same or similar systems (computer network, datacenter, etc.) and summarizes the differences and similarities. The system includes a processor and a non-transitory computer storage medium storing computer-useable instructions that, when used by the processor, cause the processor to receive historical metrics from historical nodes for two states of a historical datacenter. The historical metrics are aggregated into a historical vector representation for the historical nodes for each state of the historical datacenter. The historical vector representation includes information derived from the historical metrics of neighbors of the historical nodes. A classifier is trained with the historical vector representation and a historical annotation describing a state change between the two states of the historical datacenter to predict a summary describing the state change comprising differences and similarities between at least two states of a datacenter. A context graph corresponding to each state of the datacenter indicates a plurality of relationships among a plurality of nodes corresponding to components of a datacenter. Each node comprises properties corresponding to a particular component of the components. The context graph for each state of the datacenter is utilized to identify a symmetric difference graph. A vector representation is determined for the symmetric difference graph. The classifier is utilized to generate an annotation describing the state change between the at least two states of the datacenter.

Referring now to FIG. 1, a block diagram is provided that illustrates a state comparison system 100 that summarizes differences and similarities between states of a datacenter, in accordance with an embodiment of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The state comparison system 100 may be implemented via any type of computing device, such as computing device 600 described below with reference to FIG. 6, for example. In various embodiments, the state comparison system 100 may be implemented via a single device or multiple devices cooperating in a distributed environment.

The state comparison system 100 generally operates to provide an annotation that summarizes the differences and similarities between two given datacenter states. In embodiments, the annotation provides a textual description of the differences and similarities and/or a ranked list of the differences and similarities. As shown in FIG. 1, the state comparison system 100 communicates with, among other components not shown, datacenter 110, monitoring tool 112, and database 116. It should be understood that the state comparison system 100 shown in FIG. 1 is an example of one suitable computing system architecture. Each of the components shown in FIG. 1 may be implemented via any type of computing device, such as computing device 600 described with reference to FIG. 6, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of datacenters, monitoring tools, or historical databases may be employed by the state comparison system 100 within the scope of the present disclosure. Each may comprise a single device or multiple devices cooperating in a distributed environment. For instance, the state comparison system 100 may be provided via multiple devices arranged in a distributed environment that collectively provide the functionality described herein. In some embodiments, some or all functionality provided by monitoring tool 112 and/or database 116 may be provided by state comparison system 100. Additionally, other components not shown may also be included within the network environment.

As shown in FIG. 1, the state comparison system 100 communicates with a database 116. While only a single database 116 is shown in FIG. 1, it should be understood that the state comparison system 100 may communicate with any number of databases. Each datacenter 110 may utilize multiple databases corresponding to different entities, affiliates, business units, systems, etc., of the organization. Each database 116 may store metrics 117 of various components in the datacenter that are received from monitoring tool 112. Each database 116 may additionally store annotations 118. Annotations may include annotations with state change description 154 or annotations with state description 152. In embodiments, the supervised classifier 150 separates the annotations 118 into annotations with state change description 154 and annotations with state description 152 so that the annotations with state change description 154 are utilized as training data for the LSTM neural network 160.

The state comparison system 100 initially receives training data from database 116. The training data comprises metrics 117 corresponding to at least two states, state A 120 and state B 130, which may correspond to a timestamp indicating when the metrics were received within a particular component of datacenter 110. The training data may additionally comprise annotations with state change description 154 as provided by the supervised classifier 150.

After receiving the training data from database 116 corresponding to at least two states, the data is utilized to build a context graph or subgraph. As described above, a context graph refers to a data structure that depicts connections or relationships between components of the datacenter. The context graph consists of nodes (vertices, points) and edges (arcs, lines) that connect them. Each node represents a component and each edge represents a relationship between the corresponding components. The nodes and edges may be labeled or enriched with the metrics, anomalies, and/or other information. In some embodiments, the training data is received as a context graph or subgraph that has already been built prior to being received by state comparison system 100.

In embodiments, the training data for each state, as illustrated by state A 120 and state B 130, enables a symmetric difference graph 140 between the two states to be determined. For example, differences between the context graphs for the two states (e.g., new nodes or edges, removed nodes or edges, or metrics for nodes/edges that have significant differences (where significant can be determined by some threshold configured by a user)) are utilized to determine the symmetric difference graph. In various embodiments, the symmetric difference graph 140 may be identified using graph operators such as intersection or symmetric differences or graph homomorphism techniques that can take into account attributes and the topology of the graph (i.e., generates a mapping between components where components that have a mapping are considered similar and components that have no mappings are considered different).

An encoding or vector representation corresponding to the symmetric difference graph 140 can then be generated and is represented by a plurality of hashes. The hashes are based on selected properties of the node and selected properties of neighbors of the node. In some embodiments, padding is utilized to encode a particular property of a particular node when the node has less than K neighbors. Alternatively, if the particular node has more than K neighbors, the neighbors may be sorted by relevance for the particular property and the top K neighbors are selected.

Figure 2:
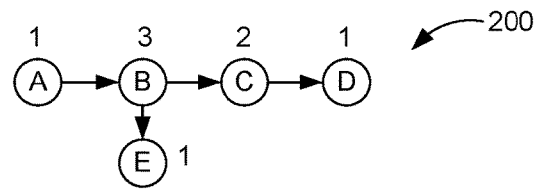
FIG. 2 is an exemplary hash algorithm for context graph nodes using a single property, in accordance with an embodiment of the present disclosure.

With reference to FIG. 2, an exemplary hash algorithm is illustrated for context graph nodes using a single property, in accordance with an embodiment of the present disclosure. The hash may be determined by state comparison system 100 of FIG. 1 utilizing the hash algorithm as shown. In this example, a hash may be determined for each node of the context graph or subgraph 200 based on selected properties. The properties may include metrics of the node and/or aggregated neighbor related information. The aggregated neighbor related information may include a number of neighbors, an absolute number of neighbors with some conditions, a relative number of neighbors with some condition, a sum/maximum/minimum/average of some node properties, etc. A number of iterations 210, 220 may also be utilized to determine the hashes. The number of iterations may be based on a diameter of the context graph or subgraph, a desired input size, etc. The information associated to a single node are the values in its column in the table for each iteration 210, 220.

For example, using a number of neighbors as the selected property, at iteration 0, the hash of node A is represented by H(1) because its only neighbor is node B. Under the same properties, the hash of nodes B, C, D, E are represented by H(3), H(2), H(1), and H(1) because nodes B, C, D, E have 3, 2, 1, 1 neighbors, respectively. In some embodiments, direction of the edges are ignored. In other embodiments, direction of the edges is utilized as a property.

In the same example, and still referring to FIG. 2, at iteration 1, the hash of node A considers a hash of (the hash of node A and the hash of node B) which can be represented by H(H(1)H(3)). Under the same properties, the hash of nodes B, C, D, E are represented by H(H(3)H(1)H(1)H(2)), H(H(2)H(1)H(3)), H(H(1)H(2)), and H(H(1)H(2)). As can be appreciated, this circular hashing process can be utilized for multiple iterations or depths of the context graph to provide a fingerprint or identifying characteristics of the context graph corresponding to the selected properties of nodes of the context graph which can be utilized to identify state similarities and differences between subject states.

Figure 3:
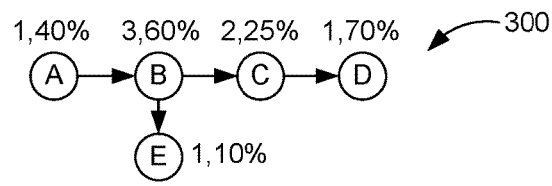
FIG. 3 is an exemplary hash algorithm for context graph nodes using multiple properties, in accordance with embodiments of the present disclosure.

Turning now to FIG. 3, an exemplary hash algorithm for context graph nodes is illustrated using multiple properties, in accordance with an embodiment of the present disclosure. The hash may be determined by annotation system 100 of FIG. 1 utilizing the hash algorithm as shown. For example, using a number of neighbors as the selected property, at iteration 0, the hash of node A is represented by H(1) 310 because its only neighbor is node B. At iteration 1, the hash of node A considers a hash of (the hash of node A and the hash of node B) which can be represented by H(H(1)H(3)) 312. Similarly, using CPU as the selected property, at iteration 0, the hash of node A is represented by H(40%) 320. At iteration 1, the hash of node A considers a hash of (the hash of node A and the hash of node B) which can be represented by H(H(40)H(60)) 322.

Figure 4:
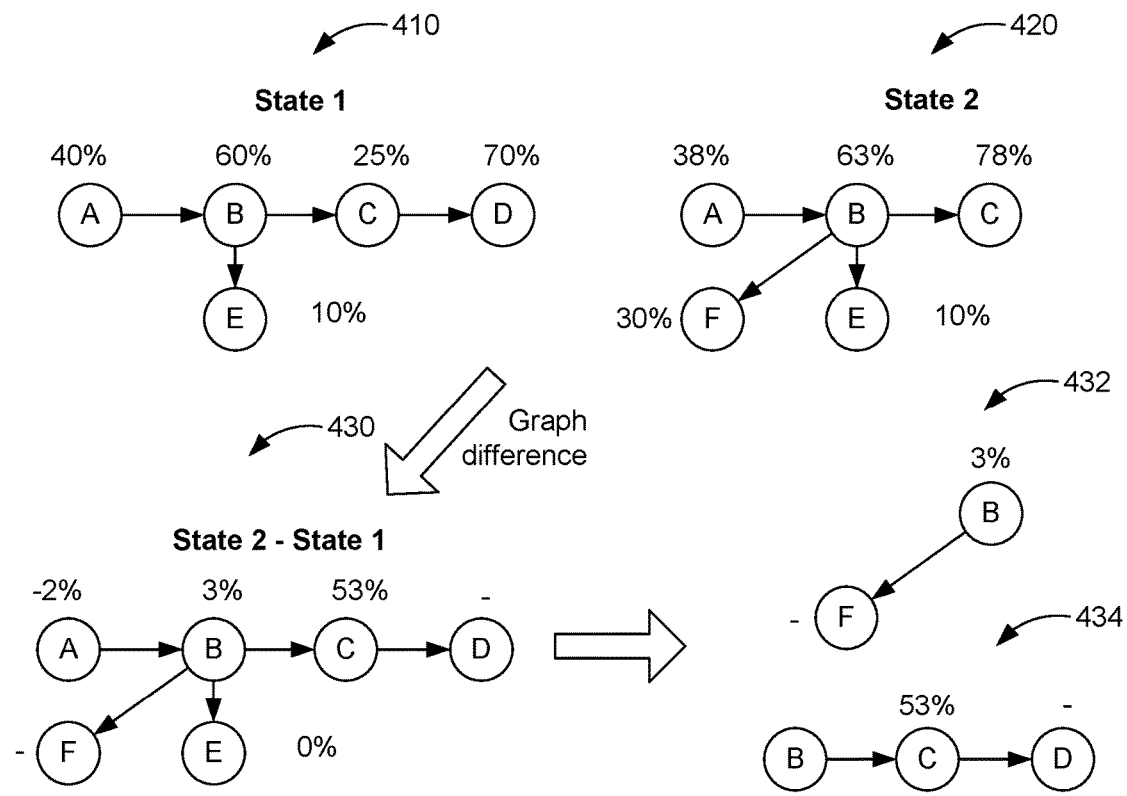
FIG. 4 is an exemplary context graph for two states of a datacenter and the resulting symmetric difference graphs, in accordance with embodiments of the present disclosure.

Referring now to FIG. 4, exemplary context graphs 410, 420 for two states of a datacenter and the resulting symmetric difference graphs 432, 434 are illustrated, in accordance with embodiments of the present disclosure FIG. 4 is an exemplary context graph for two states of a datacenter and the resulting symmetric difference graphs, in accordance with embodiments of the present disclosure. As shown, the combination of the context graphs 410, 420 yield combine graph 430. However, in this example, only small variations are seen in nodes A, B, and E. In embodiments, a configurable percentage of variation (such as may be based on a particular property) may be utilized to determine which variations are negligible such that the variation or percentage would cause the nodes to be considered similar or sufficient such that the variation or percentage would cause the nodes to be considered different. Since the variations in nodes A, B, and E are considered negligible, the symmetric difference graphs 432, 434 result and represent the differences and similarities in the states.

Figure 5:
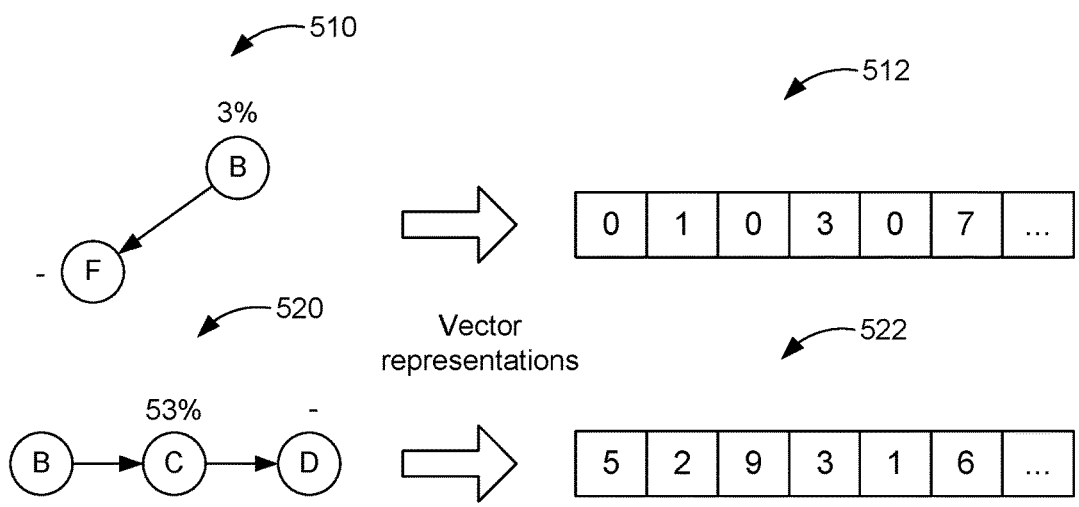
FIG. 5 is a set of exemplary symmetric difference graphs and vector representations, in accordance with embodiments of the present disclosure.

FIG. 5 is a set of exemplary symmetric difference graphs 510, 520 and vector representations 512, 522, in accordance with embodiments of the present disclosure. As shown, the resulting symmetric difference graphs 510, 520 can be utilized to determine vector representations corresponding to the similarities and differences which can be provided to the LSTM neural network as input. The values utilized in the vector representations in this example are for illustrative purposes only and do not necessarily reflect actual values that may result.

Referring back to FIG. 1, using the symmetric difference graph 140, similarities and differences 142 between the two states can been identified. A feature selector 144 selects, filters out, or scores the similarities and differences 142 to pick the most relevant ones. For example, scoring mechanism may be based on the difference in absolute value of the metrics, difference or number of common neighbors, etc. A rule based mechanism may be applied to discard undesired or irrelevant information, such as small difference on properties with high variance, changes in less than a given number of properties, etc. Machine learning techniques may also be utilized to learn to automatically rank similarities and differences. In some embodiments, a combination of these techniques may be applied to rank the similarities and differences. The resulting list of ranked similarities and differences 146 is then provided as input to the LSTM neural network 160 and the LSTM neural network 160 can be trained to predict, based on the ranked similarities and differences, an annotation comprising a description of the state change 162.

LSTM neural network 160 may include multiple layers, such as an input layer that the training data is fed into, hidden layers, and an output layer. The LSTM neural network 160 is trained, in some embodiments, with an iterative training method. For example, batch or stochastic gradient descent may be utilized to train the LSTM neural network 160.

Once the LSTM neural network 160 is trained, test data may be received by the state comparison system 100. The test data may be received, in various embodiments, from monitoring tool 112, database 116, and/or user 180. The test data comprises metrics 117. Each instance of test data also corresponds to a state that may be represented by a timestamp indicating when the metrics and/or annotation occurred within a particular component of datacenter 110. State comparison system 100 receives test data for at least two states, as illustrated in FIG. 1, by a user providing timestamps corresponding to two states 180 the user desires to compare.

After receiving the test data corresponding to at least two states, the data is utilized to build a context graph or subgraph. As described above, a context graph refers to a data structure that depicts connections or relationships between components of the datacenter. The context graph consists of nodes (vertices, points) and edges (arcs, lines) that connect them. Each node represents a component and each edge represents a relationship between the corresponding components. The nodes and edges may be labeled or enriched with the metrics, anomalies, and/or other information. In some embodiments, the test data is received as a context graph or subgraph that has already been built prior to being received by annotation system 100.

As illustrated, the test data for each state is utilized to identify a symmetric difference graph. The symmetric difference graph is utilized to determine an encoding represented by a plurality of hashes. The hashes are based on selected properties of the node and selected properties of neighbors of the node corresponding to differences between the two states. The hashes may be determined by using, for example, the hash algorithms described with respect to FIGS. 2 and 3.

The hashes are provided to state comparison system 100 which identifies and ranks the most relevant similarities and differences between the two states. The ranked similarities and differences can then be provided to LSTM neural network 160 which predicts an annotation comprising a description of the state change between the two states. In some embodiments, the description of the state change may include that the datacenter is operating normally while descriptions of state changes may include that a particular database cluster was switched off, the number of messages has increased and the message queue system has dynamically allocated more machines, and the like. The ranked similarities and the description of the state change may be provided to the user or administrator as output. Additionally or alternatively, the ranked similarities and the description of the state change may be added to an analytical report.

In some embodiments, it is possible to obtain which types of configurations (e.g., symmetric difference graphs) are associated to annotations describing a particular state change, thus creating "graph stereotypes" associated to particular problems. This information is valuable to provide human-understandable diagnosis explanations and can be used to feed a rule-based or graph-rule-based diagnostic system (i.e., a system that works with rules, but in which rules are specified using graph properties, such as reachability, centrality, etc.).

In some embodiments, LSTM neural network 160 may receive as an input a particular description of a state change. Sequences of hashes (that represent ranked similarities and differences) that correspond to the particular description of a state change are provided as output. This enables the training data to be scanned to identify which similarities and differences correspond to the particular description of a state change so that a particular problem may be diagnosed.

Turning now to FIG. 4, a flow diagram is provided that illustrates a method 400 for generating a summary describing the state change between a least two states of a datacenter, in accordance with embodiments of the present disclosure. For instance, the method 400 may be employed utilizing the state comparison system 100 of FIG. 1. As shown at step 410, at least two states of a datacenter are received. Each state of the datacenter is represented by a context graph indicating a plurality of relationships among a plurality of nodes corresponding to components of the datacenter.

A state change comprising differences and similarities between the context graph for each state is determined, at step 412. At step 414, features corresponding to the differences and similarities between properties of particular nodes or relationships between particular nodes of each context graph are selected. In some embodiments, the selected features are ranked and received as an input to the classifier. Based on the selected features, a summary is generated, at step 416, describing the state change between the at least two states of the datacenter.

In some embodiments, the features are based on comparison of hashes derived from each context graph. In some embodiments, the features are selected based on a graph operator that identifies intersections or symmetric differences between each context graph. In some embodiments, the features correspond to similarities utilize graph homomorphism techniques that utilize attributes and topology of each context graph to generate a mapping between the components. In some embodiments, the features correspond to differences comprise the components of each context graph that do not have a mapping.

Historical metrics corresponding to historical nodes may be received. The historical metrics may be received from historical nodes of multiple datacenters. The historical metrics may be received from historical nodes of the datacenter. The historical metrics are aggregated into historical vector representations for the historical nodes in the datacenter. The historical vector representations include information derived from the historical metrics of neighbors of the historical nodes and have annotations describing an anomalous condition corresponding to a particular historical node, a state of the particular historical node, and a state change corresponding to the particular historical node. In some embodiments, a classifier is trained with the historical vector representations to generate the summary describing the state change between the at least two states of the datacenter.

In some embodiments, and referring now to FIG. 5, a flow diagram is provided that illustrates a method 500 for training a classifier to predict a summary describing the state change between at least two states of a datacenter, in accordance with embodiments of the present disclosure. For instance, the method 500 may be employed utilizing the state comparison system 100 of FIG. 1. As shown at step 510, historical metrics are received from historical nodes in a historical datacenter.

The historical metrics are aggregated, at step 512, into historical vector representations for the historical nodes in the historical datacenter. The historical vector representations include information derived from the historical metrics of neighbors of the historical nodes and having annotations describing a condition corresponding to a particular historical node, a state of the datacenter, and a state change corresponding to the datacenter. A classifier is trained, at step 514, with the historical vector representations to predict a summary describing the state change between at least two states of a datacenter.

In embodiments, at least two states of the datacenter are received. Each state of the datacenter is represented by a context graph indicting a plurality of relationships among a plurality of nodes corresponding to components of the datacenter. Each node comprises properties corresponding to a particular component of the components. In some embodiments, the historical metrics and the properties are received from at least two datacenters In embodiments, a state change comprising differences and similarities between the context graph for each state is determined. For example, context vector representations of each context graph corresponding to the differences and similarities may be determined. The vector representations correspond to properties of particular nodes or relationships between particular nodes of the context graph. The context vector representation of each context graph is provided to the classifier. Utilizing the classifier, a summary is generated describing the state change between the at least two states of the datacenter In embodiments, features of each context graph corresponding to the differences and similarities between properties of particular nodes or relationships between particular nodes of each context graph may be selected. Based on the selected features, a summary is generated describing the state change between the at least two states of the datacenter.

Figure 6:
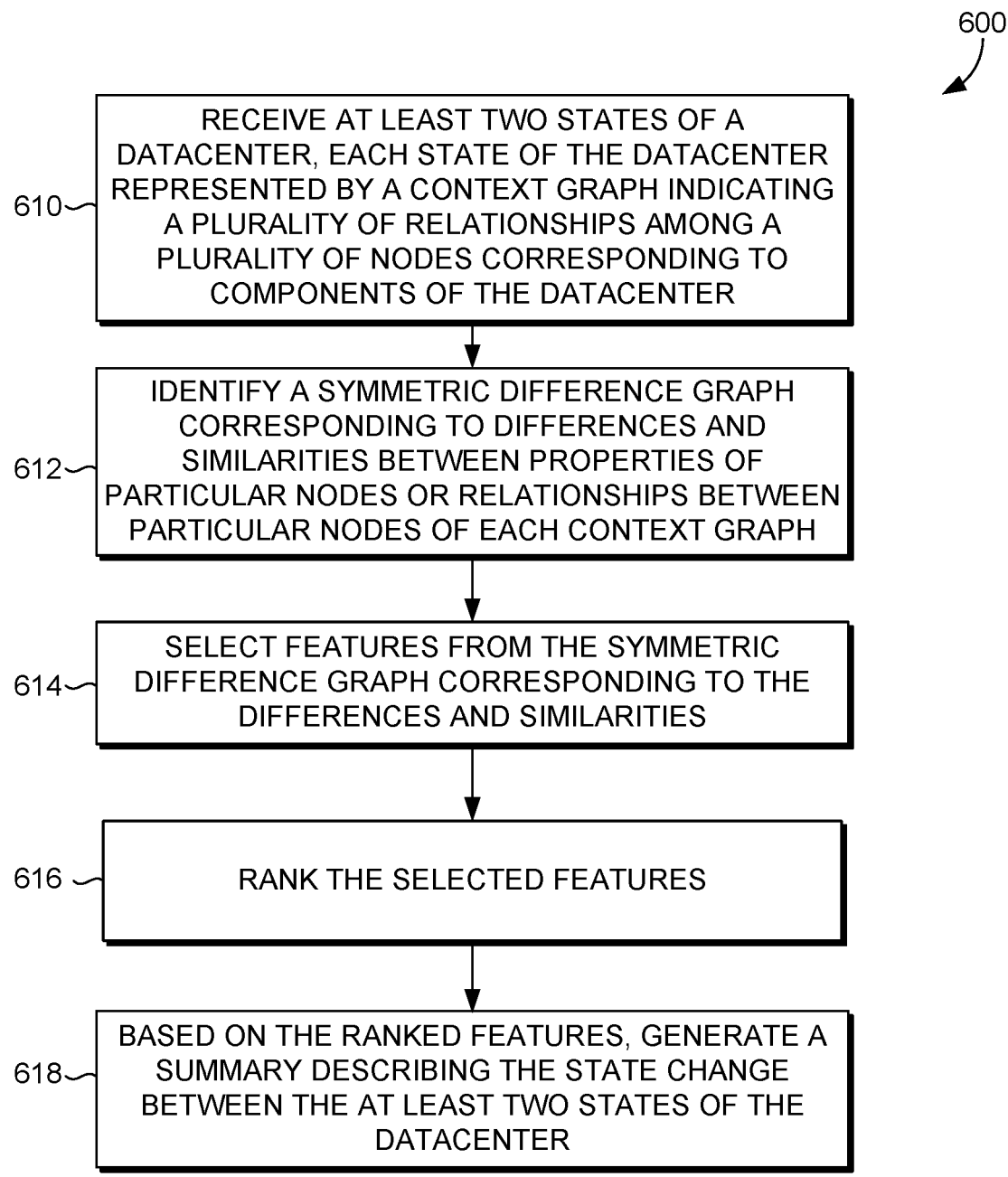
FIG. 6 is a flow diagram showing a method of generating a summary describing the state change between a least two states of a datacenter, in accordance with embodiments of the present disclosure.
Figure 7:
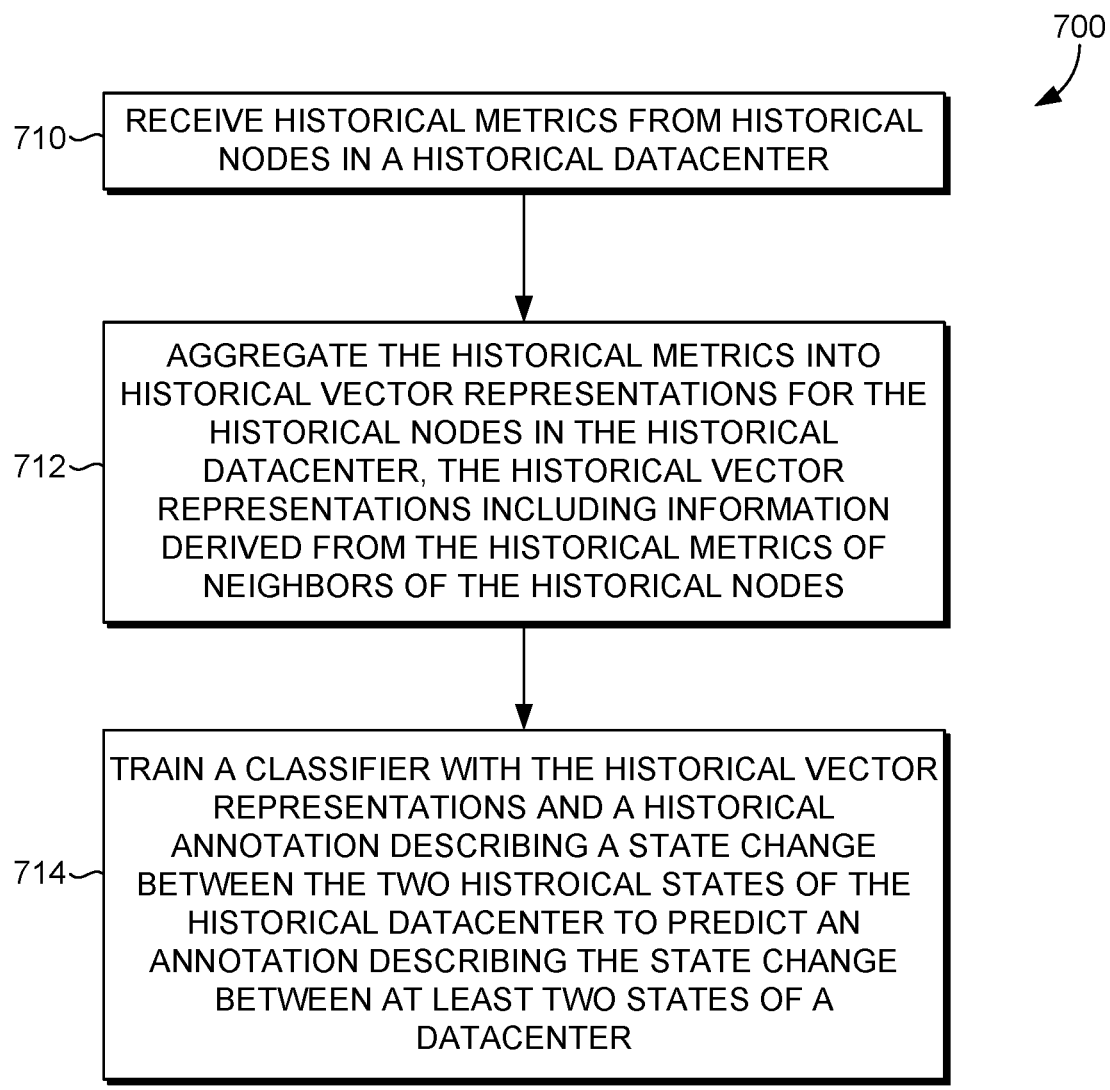
FIG. 7 is a flow diagram showing a method of for training a classifier to predict a summary describing the state change between at least two states of a datacenter, in accordance with embodiments of the present disclosure.
Figure 8:
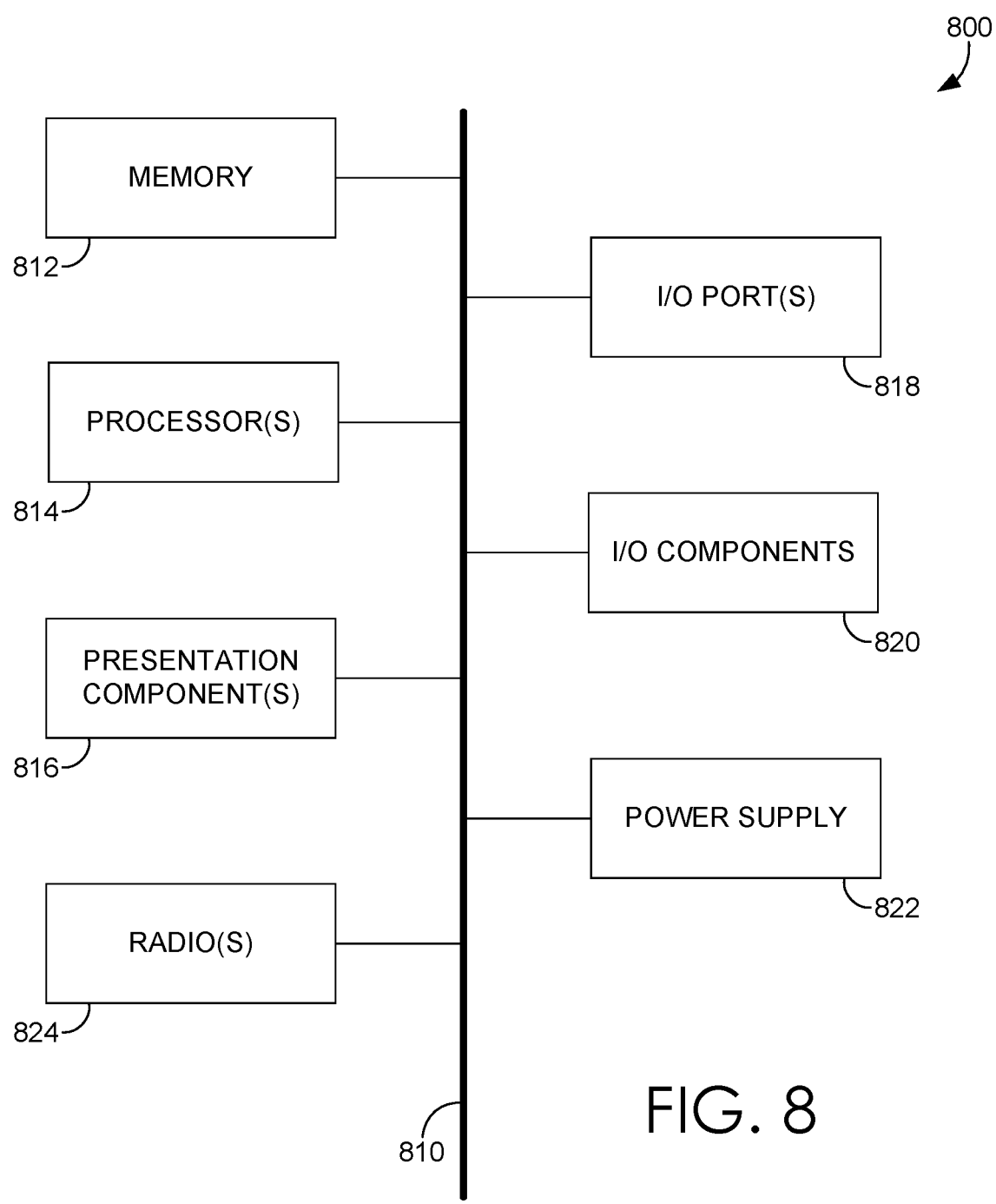
FIG. 8 is a block diagram of an exemplary computing environment suitable for use in implementing embodiments of the present disclosure.

Having described embodiments of the present disclosure, an exemplary operating environment in which embodiments of the present disclosure may be implemented is described below in order to provide a general context for various aspects of the present disclosure. Referring to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the inventive embodiments. Neither should the computing device 600 be interpreted as having any dependency or requirement relating to any one or combination of components illustrated.

The inventive embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The inventive embodiments may be practiced in a variety of system configurations, including handheld devices, consumer electronics, general-purpose computers, more specialty computing devices, etc. The inventive embodiments may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output (I/O) components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 812 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present disclosure provide for an objective approach for annotating a node of a context graph corresponding to an anomalous condition detected in a datacenter. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
receiving at least two states of a datacenter, each state of the datacenter represented by a context graph indicating a plurality of relationships among a plurality of nodes corresponding to components of the datacenter;
identifying a symmetric difference graph based on the context graphs corresponding to the at least two states of the datacenter, the symmetric difference graph representing differences and similarities between properties of particular nodes or relationships between particular nodes of each context graph;
selecting one or more features from the symmetric difference graph corresponding to the differences and similarities, wherein the selected features are represented by one or more hashes;
ranking, based on the one or more hashes, the selected features to generate a ranked set of similarities and differences; and
based on the ranked set as an input to a neural network, generating a summary annotation describing a state change between the at least two states of the datacenter.

2. The method of claim 1, receiving historical metrics corresponding to historical nodes of at least two historical states of a historical datacenter.

3. The media of claim 2, wherein the historical metrics are received from historical nodes of multiple datacenters.

4. The method of claim 2, wherein the historical metrics are received from historical nodes of the datacenter.

5. The method of claim 2, further comprising aggregating the historical metrics into historical vector representations for the historical nodes for each historical state of the historical datacenter, the historical vector representations including information derived from the historical metrics of neighbors of the historical nodes and having annotations describing a historical state change between the at least two historical states of the historical datacenter.

6. The method of claim 5, further comprising utilizing a classifier trained with the historical vector representations and the annotations describing a historical state change between the at least two historical states of the historical datacenter to generate the summary describing the state change between the at least two states of the datacenter.

7. The method of claim 5, wherein the annotations further include a description of a state of the historical datacenter.

8. The method of claim 7, further comprising a supervised classifier that filters out the description of the state of the historical datacenter.

9. The method of claim 1, wherein the features are based on comparisons of hashes derived from each context graph.

10. The method of claim 1 wherein the features are selected based on a graph operator that identifies intersections or symmetric differences between each context graph.

11. The method of claim 1 wherein the features corresponding to similarities utilize graph homomorphism techniques that utilize attributes and topology of each context graph to generate a mapping between the components.

12. The method of claim 11, wherein the features corresponding to differences comprise the components of each context graph that do not have a mapping.

13. A method comprising:
receiving historical metrics from historical nodes corresponding to two historical states of a historical datacenter;
aggregating the historical metrics into historical vector representations for the historical nodes in the historical datacenter, the historical vector representations including information derived from the historical metrics of neighbors of the historical nodes; and
training a classifier with the historical vector representations and a historical annotation describing a state change between the two historical states of the historical datacenter to predict an annotation describing the state change between at least two states of a datacenter, wherein the prediction is based on a symmetric difference graph generated from context graphs corresponding to the at least two states of the datacenter, the symmetric difference graph representing differences and similarities between properties of particular nodes or relationships between particular nodes of each context graph.

14. The method of claim 13, further comprising receiving at least two states of the datacenter, each state of the datacenter represented by a context graph indicting a plurality of relationships among a plurality of nodes corresponding to components of the datacenter, each node comprising properties corresponding to a particular component of the components.

15. The method of claim 14, further comprising determining a symmetric difference graph corresponding to differences and similarities between properties of particular nodes or relationships between particular nodes of each context graph.

16. The method of claim 15, further comprising selecting features from the symmetric difference graph corresponding to the differences and similarities.

17. The method of claim 16, further comprising ranking the selected features.

18. The method of claim 15, further comprising based on the ranked features, generating an annotation describing the state change between the at least two states of the datacenter.

19. The method of claim 13, wherein the historical metrics are received from at least two datacenters.

20. A computerized system:
a processor; and
a non-transitory computer storage medium storing computer-useable instructions that, when used by the processor, cause the processor to:
receive historical metrics from historical nodes for two states of a historical datacenter;
aggregate the historical metrics into historical vector representations for the historical nodes of the historical datacenter, the historical vector representations including information derived from the historical metrics of neighbors of the nodes;
train a classifier with the historical vector representations and a historical annotation describing a state change between the two states of the historical datacenter to predict a summary describing the state change comprising differences and similarities between at least two states of a datacenter, each state represented by a context graph, each context graph indicating a plurality of relationships among a plurality of nodes corresponding to components of the datacenter, each node comprising properties corresponding to a particular component of the components;
utilize the context graph for each state of the datacenter to identify a symmetric difference graph based on the context graphs corresponding to the at least two states of the datacenter, the symmetric difference graph representing a subset of differences and similarities between properties of particular nodes or relationships between particular nodes of each context graph;

determine a vector representation for the symmetric difference graph; and utilize the classifier to generate an annotation describing the state change between the at least two states of the datacenter based on a filtered set of features selected from the symmetric difference graph as an input to the classifier.

* * * * *